United States Patent
Li et al.

(10) Patent No.: US 10,209,814 B2
(45) Date of Patent: Feb. 19, 2019

(54) IMAGE PROCESSING DEVICE AND IMAGE PROCESSING METHOD

(71) Applicant: NUBIA TECHNOLOGY CO., LTD., Shenzhen, Guangdong (CN)

(72) Inventors: Qiang Li, Shenzhen (CN); Shaohua Tang, Shenzhen (CN)

(73) Assignee: Nubia Technology Co., LTD. (CN)

(*) Notice: Subject to any disclaimer, the term of this patent is extended or adjusted under 35 U.S.C. 154(b) by 0 days.

(21) Appl. No.: 15/122,090

(22) PCT Filed: Dec. 18, 2014

(86) PCT No.: PCT/CN2014/094157
§ 371 (c)(1),
(2) Date: Aug. 26, 2016

(87) PCT Pub. No.: WO2015/131616
PCT Pub. Date: Sep. 11, 2015

(65) Prior Publication Data
US 2017/0017334 A1    Jan. 19, 2017

(30) Foreign Application Priority Data

Mar. 3, 2014  (CN) .......................... 2014 1 0074989
Mar. 3, 2014  (CN) .......................... 2014 1 0075025

(51) Int. Cl.
*G06F 3/041*   (2006.01)
*H04N 5/232*   (2006.01)
(Continued)

(52) U.S. Cl.
CPC .......... *G06F 3/0416* (2013.01); *G06F 3/0488* (2013.01); *G06F 3/04845* (2013.01);
(Continued)

(58) Field of Classification Search
CPC .. G06F 3/0416; G06F 3/04845; G06F 3/0488; G06F 2203/04808; G06T 11/60;
(Continued)

(56) References Cited

U.S. PATENT DOCUMENTS

| 2010/0194705 A1 | 8/2010 | Kim |
| 2014/0002471 A1 | 1/2014 | Yeo et al. |
| 2014/0037057 A1 | 2/2014 | Kim |

FOREIGN PATENT DOCUMENTS

| CN | 101794190 A | 8/2010 |
| CN | 102349045 A | 2/2012 |

(Continued)

OTHER PUBLICATIONS

English Translation of the Written Opinion of the International Searching Authority dated Mar. 27, 2015 in International Application No. PCT/CN2014/094157, 15 pages.
(Continued)

*Primary Examiner* — Abhishek Sarma
(74) *Attorney, Agent, or Firm* — Eric L. Sophir; Dentons US LLP (57) ABSTRACT

Disclosed are an image processing device and an image processing method. The image processing device comprises: a display means, which is configured to display an operation object, a touch means, which is configured to detect a first action and a second action of a touch operation, and a processing means, which is configured to determine a first position of the first action on the operation object and a second position of the second action on the operation object and to adjust a display parameter at the first position on the operation object and a display parameter at the second position. Employment of the present invention allows for content having a user-personalized operation to be photographed or produced and allows implementation of partial display parameter adjustment.

11 Claims, 5 Drawing Sheets

(51) Int. Cl.
*G06F 3/0488* (2013.01)
*G06F 3/0484* (2013.01)
*G06T 11/00* (2006.01)
*G06T 11/60* (2006.01)

(52) U.S. Cl.
CPC ............ *G06T 11/001* (2013.01); *G06T 11/60* (2013.01); *H04N 5/23216* (2013.01); *H04N 5/23293* (2013.01); *G06F 2203/04808* (2013.01)

(58) Field of Classification Search
CPC .............. G06T 11/001; H04N 5/23216; H04N 5/23293
See application file for complete search history.

(56) References Cited

FOREIGN PATENT DOCUMENTS

| | | |
|---|---|---|
| CN | 102754050 A | 10/2012 |
| CN | 102779004 A | 11/2012 |
| CN | 103218110 A | 7/2013 |
| CN | 103530033 A | 1/2014 |
| CN | 103565452 A | 2/2014 |
| CN | 103873771 A | 6/2014 |
| CN | 103873838 A | 6/2014 |

OTHER PUBLICATIONS

English Translation of International Search Report dated Mar. 27, 2015 in International Application No. PCT/CN2014/094157, 5 pages.

IMAGE PROCESSING DEVICE AND IMAGE PROCESSING METHOD

CROSS REFERENCE TO RELATED APPLICATIONS

This application is a National Stage Application of International Application No. PCT/CN2014/094157, filed Dec. 18, 2014, which claims priority to Chinese Patent Application No. 201410074989.0, filed Mar. 3, 2014, and Chinese Patent Application No. 201410075025.8, filed Mar. 3, 2014, the contents of which are incorporated herein by reference in their entirety.

TECHNICAL FIELD

The disclosure relates to the technical field of image processing, and in particular to an image processing device and an image processing method.

BACKGROUND

For a person in fond of taking scenery photos, a gradient filter always achieves a subversive effect on photos. Since a scenery photo usually has a brighter sky and a darker ground, a gradient filter may well reflect levels of the sky and also effectively reduce pressure of strong light on tolerance of a camera.

It is common for professional video cameras such as single lens reflexes cameras to use a gradient filter function. However, mobile equipment such as a mobile phone may not yet support such a function due to lack of a corresponding gradient filter.

In addition, existing mobile equipment may have many functional deficiencies in terms of image processing, and may also not meet requirements of high speed and convenience of a user. For example, the user is required to learn multiple operating steps. Therefore, the user may not shoot or make photos which are aesthetic or subjected to personalized operation of the user by virtue of the mobile equipment.

Moreover, some existing image processing functions may not implement adjustment operation over local regions but process the whole picture only.

SUMMARY

In view of this, the technical problem to be solved by the disclosure is to provide an image processing device and an image processing method, which may shoot or make contents subjected to personalized operation of a user and implement local adjustment.

In order to achieve the purpose, the disclosure provides an image processing device, which may include:

a display module configured to display an operation object;

a touch control module configured to detect a first action and second action of touch operation; and a processing module configured to determine a first position of the first action on the operation object and a second position of the second action on the operation object, and adjust a display parameter in the first position on the operation object, a display parameter in the second position on the operation object and a display parameter of a region between the first position and the second position, the display parameter of the region between the first position and the second position being changed gradually.

The disclosure further provides an image processing device, which may include:

a display module configured to display an operation object;

a touch control module configured to detect a first action and second action of touch operation; and a processing module configured to determine a first position of the first action on the operation object and a second position of the second operation on the operation object, and adjust a display parameter in the first position on the operation object and a display parameter in the second position on the operation object.

Preferably, the display parameter may include colour, colour temperature, luminance, contrast, saturation or/and acutance.

Preferably, the touch control module may include a first detection module which may be configured to detect the first action changed from non-contact to contact with the touch control module.

Preferably, the touch control module may include a second detection module which may be configured to detect the second action changed from contact to non-contact with the touch control module.

Preferably, the processing module may include a position determination module which may be configured to determine the first position of the first action on the operation object and the second position, which is different from the first position, of the second action on the operation object.

Preferably, the display parameter may be colour, the processing module may include a colour adjustment module which may be configured to adjust a colour in the first position on the operation object and a colour in the second position on the operation object, a adjustment degree of the colour is different between the first position and the second position.

Preferably, the processing module may further be configured to adjust a display parameter of a region between the first position and the second position on the operation object.

Preferably, the processing module may further be configured to adjust the display parameter of the region between the first position and the second position on the operation object to gradually change the display parameter of the region between the first position and the second position.

Preferably, the region between the first position and the second position may be defined by a first line passing through the first position, a second line passing through the second position and a display boundary of the operation object.

Preferably, the first line may be intersected with the display boundary of the operation object with two intersections.

Preferably, the second line may be intersected with the display boundary of the operation object with two intersections.

Accordingly, the disclosure further provides an image processing method, which may include that:

an operation object is displayed;

a first action and second action of touch operation over the operation object are detected; and a first position of the first action on the operation object and a second position of the second action on the operation object are determined, and a display parameter in the first position on the operation object and a display parameter in the second position on the operation object are adjusted.

Preferably, the first action may be an action changed from non-contact to contact with a touch control module.

Preferably, the second action may be a second action changed from contact to non-contact with the touch control module.

Preferably, the first action and the second action may form a time sequence relationship.

Preferably, the first position may be different from the second position.

Preferably, the method may further include that: an adjustment degree of the display parameter is different between the first position and the second position.

Preferably, the method may further include that: a display parameter of a region between the first position and the second position on the operation object is adjusted.

Preferably, the method may further include that: the display parameter of the region between the first position and the second position on the operation object is adjusted to gradually change the display parameter of the region between the first position and the second position.

Preferably, the region between the first position and the second position may be defined by a first line passing through the first position, a second line passing through the second position and a display boundary of the operation object.

Preferably, the first line may be intersected with the display boundary of the operation object with two intersections.

The disclosure further provides an image processing device, which may include:

a display module configured to display an operation object;

a detection module configured to detect touch operation over the operation object;

a region determination module configured to determine a region defined by a trajectory of the touch operation on the operation object according to the touch operation; and a processing module configured to adjust a display parameter of the region.

Preferably, the region may include a display boundary of the operation object.

Preferably, the trajectory of the touch operation may be a closed loop.

Preferably, a region on which no touch operation is performed may be contained within the closed loop.

Preferably, the processing module may include a filter module, and the filter module may be configured to adjust a display effect on the region.

Preferably, the image processing device may further include a moving module which may be configured to move the region.

Accordingly, the disclosure also provides an image processing method, which may include that:

an operation object is displayed;

touch operation over the operation object is detected; and a region defined by a trajectory of the touch operation is determined on the operation object according to the touch operation, and a display parameter of the region is adjusted.

Preferably, the region may include a display boundary of the operation object.

Preferably, the trajectory of the touch operation may be a closed loop.

Preferably, a region on which no touch operation is performed may be contained within the closed loop.

Preferably, the step that the display parameter of the region is adjusted may include that:

a display effect is adjusted on the region to achieve a filter effect.

Preferably, the method may further include that: the region is moved.

According to the image processing method and device of the disclosure, the region of which the display parameter is adjusted is selected according to the touch operation over the operation object, so that a user may shoot or make contents subjected to personalized operation of the user, and moreover, the display effect of a part of the contents may be adjusted.

DETAILED DESCRIPTION

The disclosure will be further described below in conjunction with the drawings and embodiments in detail. It should be understood that specific embodiments described herein are only adopted to explain the disclosure and not intended to limit the disclosure.

Embodiment 1

Figure 1:
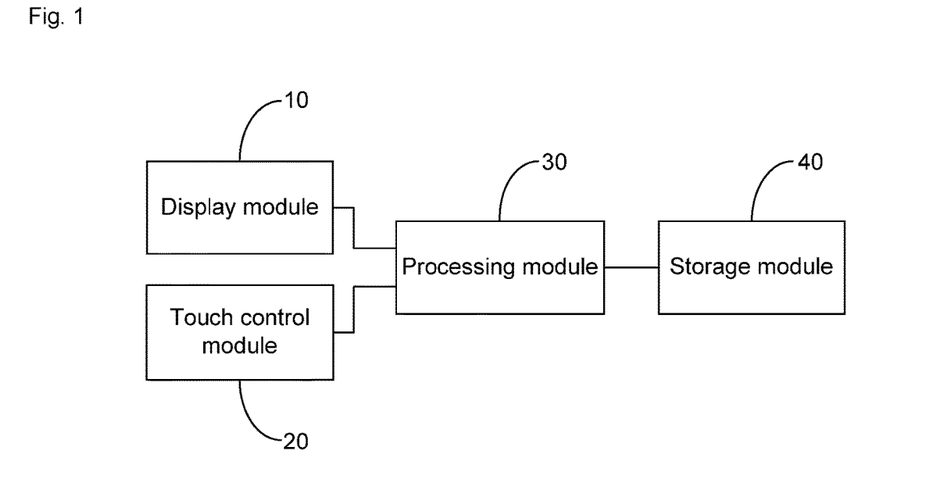
FIG. 1 is a schematic block diagram of an image processing device according to a first embodiment of the disclosure.

With reference to FIG. 1, FIG. 1 is a schematic block diagram of an image processing device according to a first embodiment of the disclosure.

The image processing device includes a display module 10, a touch control module 20, a processing module 30 and a storage module 40.

The display module 10 is configured to display an operation object. The display module 10 is a liquid crystal display screen, an Organic Light Emitting Diode (OLED) display screen, an electronic ink display screen, an electrowetting display screen or another display screen. The operation object is a visualized content, such as a video, an image, a preview picture transmitted from a camera or others.

The touch control module 20 is configured to detect a first action and second action of touch operation. The touch control module 20 is a touch panel. The touch control module 20 and the display module 10 may be the same module or different modules. The touch operation may be sliding touch operation or discontinuous touch operation, and is not limited to the two.

The first action and second action of the touch operation may form multiple combinations, the two actions are the same or different, and the condition that they are different is not limited to the followings:

1: the first action is an action changed from non-contact to contact with the touch control module 20, and the second action is an action of another type;

2: the second action is a second action changed from contact to non-contact with the touch control module 20, and the first action is an action of another type; and 3: the first action is an action changed from non-contact to contact with the touch control module 20, and the second action is a second action changed from contact to non-contact with the touch control module 20.

Corresponding to the first or third condition, the touch control module 20 includes a first detection module which is configured to detect the first action changed from non-contact to contact with the touch control module 20.

Corresponding to the first or second condition, the touch control module 20 includes a second detection module which is configured to detect the second action changed from contact to non-contact with the touch control module 20.

The processing module 30 is configured to determine a first position of the first action on the operation object and a second position of the second action on the operation object, and adjust a display parameter in the first position on the operation object and a display parameter in the second position on the operation object.

The display parameter includes, but not limited to a parameter such as colour, colour temperature, luminance, contrast, saturation or acutance. Here, the condition that the display parameter includes colour is taken as an example for description. The processing module 30 includes a position determination module and a colour adjustment module.

The position determination module is configured to determine the first position of the first action on the operation object and the second position of the second action on the operation object. The first position is the same as or different from the second position, and in the embodiment, the condition that the first position is different from the second position is taken as an example.

The colour adjustment module is configured to adjust a colour in the first position on the operation object and a colour in the second position on the operation object. A adjustment degree of the colour in the first position is the same as or different from a adjustment degree of the colour in the second position. In the embodiment, the condition that the adjustment degree of the colour is different between the first position and the second position is taken as an example.

The storage module 40 is configured to store the adjusted operation object.

Figure 2:
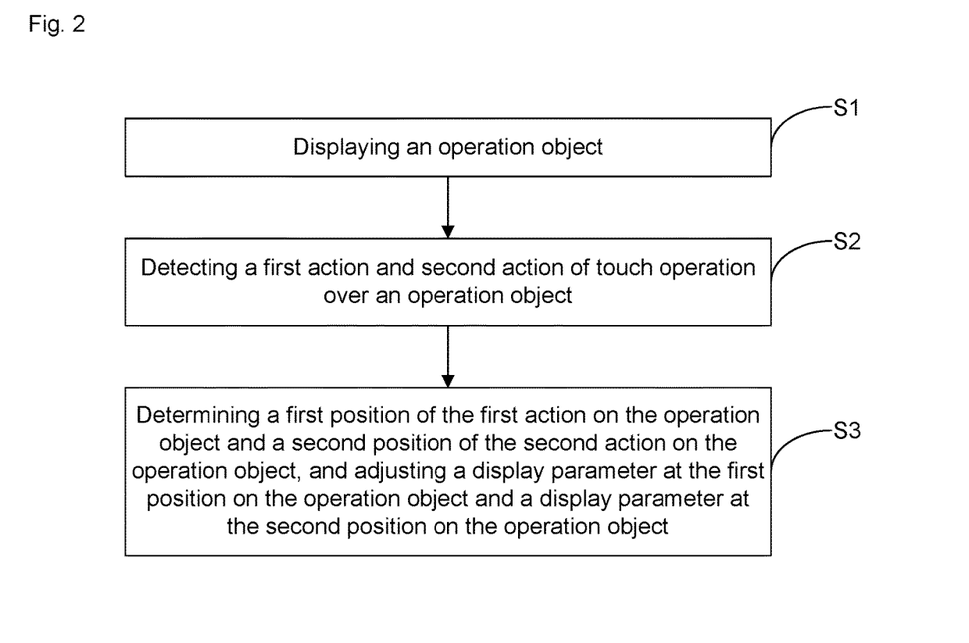
FIG. 2 is a schematic flowchart of an image processing method according to a first embodiment of the disclosure.

Accordingly, with reference to FIG. 2, FIG. 2 is a schematic flowchart of an image processing method according to a first embodiment of the disclosure.

The image processing method includes the following steps.

Step 1: an operation object is displayed.

Specifically, the operation object is displayed by a display module 10. The display module 10 is a liquid crystal display screen, an OLED display screen, an electronic ink display screen, an electrowetting display screen, a projection screen or another display screen. The operation object is a visualized content, such as a video, an image or others.

Step 2: a first action and second action of touch operation over the operation object are detected.

Specifically, the first action and second action of the touch operation are detected by a touch control module 20. The touch control module 20 is a touch panel. The touch control module 20 and the display module 10 may be the same module or different modules. The touch operation may be sliding touch operation or discontinuous touch operation, and is not limited to the two.

In some embodiments, the first action and the second action are simultaneously executed. In the embodiment, the first action and the second action form a time sequence relationship.

In some embodiments, the first position and the second position are the same. In the embodiment, the first position is different from the second position.

The first action and second action of the touch operation may form multiple combinations, the two are the same or different, and the condition that they are different is not limited to the followings:

1: the first action is an action changed from non-contact to contact with the touch control module 20, and the second action is an action of another type;

2: the second action is a second action changed from contact to non-contact with the touch control module 20, and the first action is an action of another type; and 3: the first action is an action changed from non-contact to contact with the touch control module 20, and the second action is a second action changed from contact to non-contact with the touch control module 20. For example, the first action and second action of the touch operation over the operation object are executed by a finger of a user which contacts with the touch control module 20, slides on the touch control module 20 by a certain distance and then leaves the touch control module 20.

Corresponding to the first or third condition, the touch control module 20 includes a first detection module which is configured to detect the first action changed from non-contact to contact with the touch control module 20.

Corresponding to the first or second condition, the touch control module 20 includes a second detection module which is configured to detect the second action changed from contact to non-contact with the touch control module 20.

Step 3: a first position of the first action on the operation object and a second position of the second action on the operation object are determined, and a display parameter in the first position on the operation object and a display parameter in the second position on the operation object are adjusted.

Specifically, the first position of the first action on the operation object and the second position of the second action on the operation object are determined by a processing module 30, and the display parameter in the first position on the operation object and the display parameter in the second position on the operation object are adjusted by the processing module 30. For example, when the display parameter is colour, a colour in the first position on the operation object and a colour in the second position on the operation object are adjusted.

For example, the display parameter includes colour, and the processing module 30 includes a position determination module and a colour adjustment module.

The position determination module is configured to determine the first position of the first action on the operation object and the second position of the second action on the operation object. The first position is the same as or different from the second position. In the embodiment, the condition that the first position is different from the second position is taken as an example.

The colour adjustment module is configured to adjust a colour in the first position on the operation object and a colour in the second position on the operation object. A adjustment degree of the colour in the first position is the same as or different from a adjustment degree of the colour in the second position. In the embodiment, the condition that the adjustment degree of the colour is different between the first position and the second position is taken as an example.

The image processing method further includes that the adjusted operation object is stored.

In addition, for example, the display parameter includes luminance, and the processing module is further configured to adjust luminance in the first position on the operation object and/or luminance in the second position on the operation object. The image processing method further includes that the luminance in the first position on the operation object and/or the luminance in the second position on the operation object are/is adjusted.

Embodiment 2

Embodiment 2 is substantially the same as embodiment 1, and will not be elaborated herein. The differences lie in that:

the processing module is further configured to: adjust a display parameter of a region between the first position and the second position on the operation object. For example, when the display parameter includes colour or/and luminance, the processing module adjusts a colour or/and luminance of the region between the first position and the second position on the operation object.

The image processing method further includes that: the display parameter of the region between the first position and the second position on the operation object is adjusted. For example, when the display parameter includes colour or/and luminance, the colour or/and luminance of the region between the first position and the second position on the operation object is/are adjusted.

Figure 3:
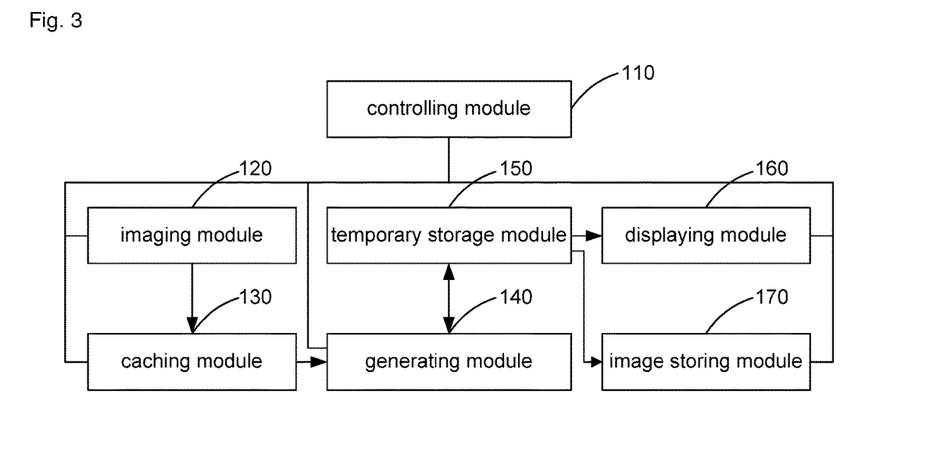
FIG. 3 is a schematic diagram of a region between a first position and a second position according to a first embodiment of the disclosure.

The region between the first position and the second position can be various regions. In the embodiment, the following manner is taken as an example for description:

as shown in FIG. 3, the region between the first position a and the second position b be defined by a first line A passing through the first position a, a second line B passing through the second position b and a display boundary C of the operation object c. For clarity, the dot-and-dash line in FIG. 3 represents the region between the first position a and the second position b. The first line A and the second line B are not limited to curves, broken lines or straight lines.

Optionally, the first line is intersected with the display boundary of the operation object with two intersections.

Or optionally, the second line is intersected with the display boundary of the operation object with two intersections.

Or optionally, the first line is intersected with the display boundary of the operation object with two intersections; and the second line is intersected with the display boundary of the operation object with two intersections.

Or optionally, the first line is intersected with the display boundary of the operation object with two intersections; the second line is intersected with the display boundary of the operation object with two intersections; and the intersections of the first line and the display boundary of the operation object are different from the intersections of the second line and the display boundary of the operation object.

Or optionally, the first line is intersected with the display boundary of the operation object with two intersections; the second line is intersected with the display boundary of the operation object with two intersections; and the intersections of the first line and the display boundary of the operation object and the intersections of the second line and the display boundary of the operation object share at least one same intersection.

Embodiment 3

Embodiment 3 is substantially the same as embodiment 1, and will not be elaborated herein. The differences lie in that:

the processing module is further configured to: adjust the display parameter of the region between the first position and the second position on the operation object to gradually change the display parameter of the region between the first position and the second position. For example, when the display parameter includes colour or/and luminance, the processing module adjusts the colour or/and luminance of the region between the first position and the second position on the operation object to gradually change the colour or/and luminance of the region between the first position and the second position.

The image processing method further includes that: the display parameter of the region between the first position and the second position on the operation object is adjusted to gradually change the display parameter of the region between the first position and the second position. For example, when the display parameter includes colour or/and luminance, the colour or/and luminance of the region between the first position and the second position on the operation object is/are adjusted to gradually change the colour or/and luminance of the region between the first position and the second position.

The region between the first position and the second position can be of various regions. In the embodiment, the following manner is taken as an example for description:

as shown in FIG. 3, the region between the first position a and the second position b includes: the region defined by the first line A passing through the first position a, the second line B passing through the second position b and the display boundary C of the operation object c. For clarity, the dot-and-dash line in FIG. 3 represents the region between the first position a and the second position b. The first line A and the second line B are not limited to curves, broken lines or straight lines.

Optionally, the first line is intersected with the display boundary of the operation object with two intersections.

Or optionally, the second line is intersected with the display boundary of the operation object with two intersections.

Or optionally, the first line is intersected with the display boundary of the operation object with two intersections; and the second line is intersected with the display boundary of the operation object with two intersections.

Or optionally, the first line is intersected with the display boundary of the operation object with two intersections; the second line is intersected with the display boundary of the operation object with two intersections; and the intersections of the first line and the display boundary of the operation object are different from the intersections of the second line and the display boundary of the operation object.

Or optionally, the first line is intersected with the display boundary of the operation object with two intersections; the second line is intersected with the display boundary of the operation object with two intersections; and the intersections of the first line and the display boundary of the operation object and the intersections of the second line and the display boundary of the operation object share at least one same intersection.

Embodiment 4

Figure 4:
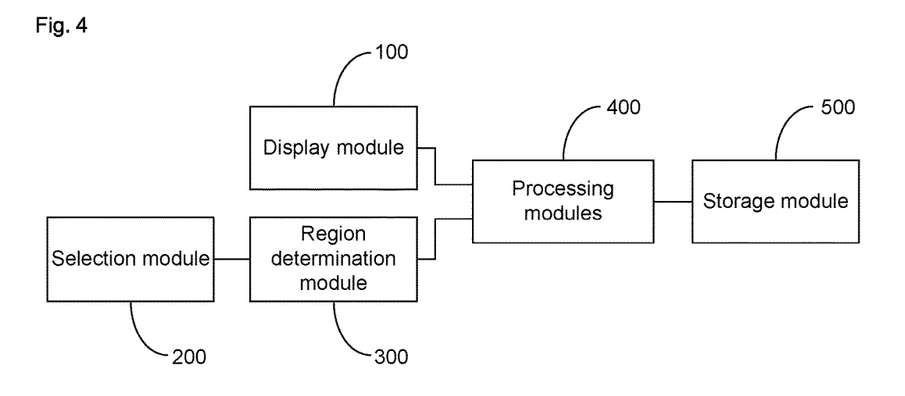
FIG. 4 is a schematic block diagram of an image processing device according to a fourth embodiment of the disclosure.

With reference to FIG. 4, FIG. 4 is a schematic block diagram of an image processing device according to a fourth embodiment of the disclosure.

The image processing device includes a display module 100, a detection module 200, a region determination module 300, a processing module 400 and a storage module 500.

The display module 100 is configured to display an operation object. The display module 100 is a liquid crystal display screen, an OLED display screen, an electronic ink display screen, an electrowetting display screen or another display screen. The operation object is a visualized content, such as a video, an image, a preview picture transmitted from a camera or others.

The detection module 200 is configured to detect touch operation over the operation object. The detection module 200 is a sensor or a touch panel. The detection module 200 and the display module 100 may be the same module or different modules. The touch operation may be sliding touch operation or discontinuous touch operation, and is not limited to the two.

The region determination module 300 is configured to determine a region including a trajectory of the touch operation on the operation object according to the touch operation. In one preferred implemention, the region includes a display boundary of the operation object.

Optionally, the trajectory of the touch operation is a closed loop. Optionally, a region on which no touch operation is performed may be further contained within the closed loop.

Figure 5:
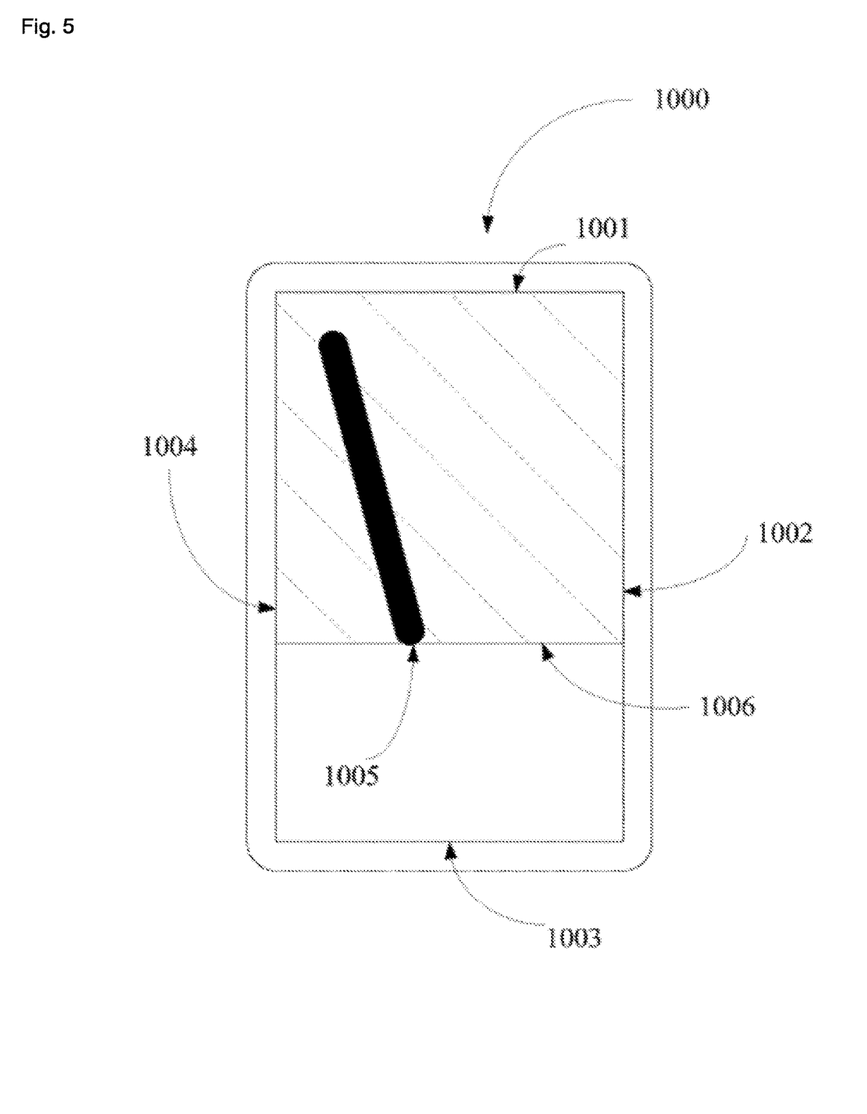
FIG. 5 is a schematic diagram of a region according to a fourth embodiment of the disclosure.

In another preferred implementation, the image processing device is, for example, a mobile phone. As shown in FIG. 5, a display screen (display module 100) of the mobile phone 1000 displays a picture (operation object), and a display boundary of which is a rectangle including four sides, such a first side 1001, second side 1002, third side 1003 and fourth side 1004, which are connected in sequence. Touch operation is executed by sliding from the first side 1001 (in proximity to or in touch with the side) to the third side 1004 (in proximity to or in touch with the side), staying in a position 1005 and then ending the touch operation, and a trajectory of the touch operation is denoted by the black line in FIG. 5. At this moment, the region includes a region from the first side 1001 to a line 1006 passing through the position 1005 at which the touch operation stays, and for clarity, the region is denoted by the dot-and-dash line in FIG. 5.

The processing module 400 is configured to adjust a display parameter of the region. The processing module 400 includes a filter module which is configured to adjust a display effect on the region. The filter module is configured to adjust the display effect on the region to change the display parameter such as colour temperature, luminance or contrast on the region, for example, to achieve an effect of a gradient filter.

The storage module 500 is configured to store the adjusted operation object.

Figure 6:
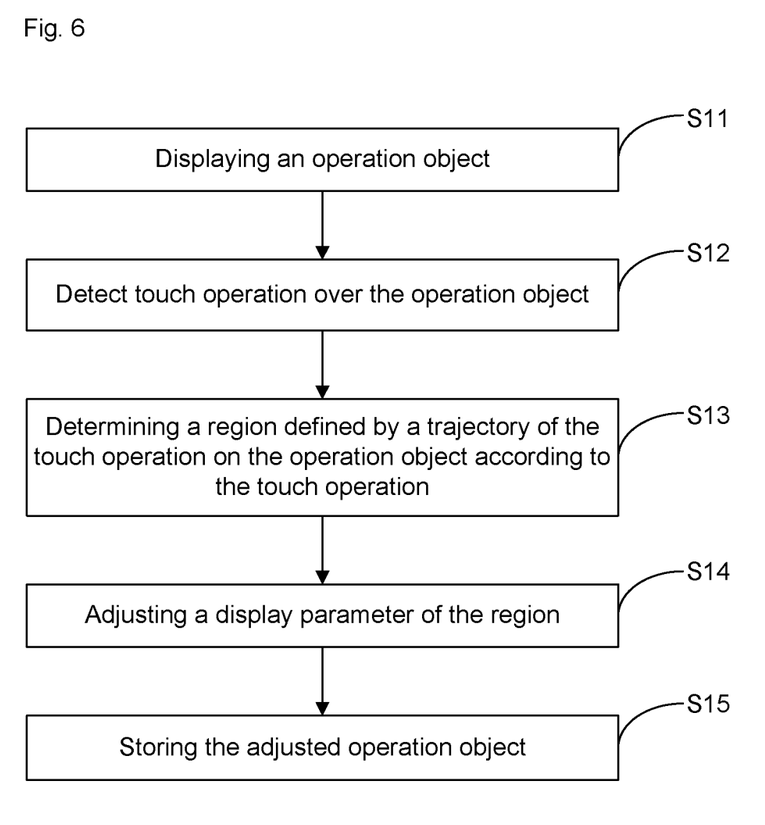
FIG. 6 is a schematic flowchart of an image processing method according to a fourth embodiment of the disclosure.

Accordingly, with reference to FIG. 6, FIG. 6 is a schematic flowchart of an image processing method according to a fourth embodiment of the disclosure.

The image processing method includes the following steps.

Step 11: an operation object is displayed.

Specifically, the operation object is displayed by a display module 100. The display module 100 is a liquid crystal display screen, an OLED display screen, an electronic ink display screen, an electrowetting display screen or another display screen. The operation object is a visualized content, such as a video, an image, a preview picture transmitted from a camera or others.

Step 12: touch operation over the operation object is detected.

Specifically, the touch operation over the operation object is detected by a detection module 200. The detection module 200 is a sensor or a touch panel. The detection module 200 and the display module 100 may be the same module or different modules. The touch operation may be sliding touch operation or discontinuous touch operation, and is not limited to the two.

Step 13: a region including a trajectory of the touch operation is determined on the operation object according to the touch operation.

Specifically, the region including the trajectory of the touch operation on the operation object is determined by a region determination module 300 according to the touch operation. Preferably, the region includes a display boundary of the operation object.

Step 14: a display parameter of the region is adjusted.

Specifically, the display parameter of the region is adjusted by a processing module 400. The processing module 400 includes a filter module which is configured to adjust a display effect on the region. The filter module is configured to adjust the display effect on the region to change the display parameter such as colour, colour temperature, luminance, saturation, acutance, or contrast on the region, for example, to achieve an effect of a filter, or to achieve an effect of a gradient filter.

Step 15: the adjusted operation object is stored.

Specifically, the adjusted operation object is stored in a storage module 500. In addition, Step 15 is an optional step.

Embodiment 5

Embodiment 5 is substantially the same as embodiment 4, and will not be elaborated herein. The differences lie in that:

the image processing device further includes a moving module. The moving module is configured to move the region.

The image processing method further includes the following step that:

the region is moved.

In each of the abovementioned embodiments, the image processing device may be any electronic device capable of communicating with other equipment, including, but not limited to: a personal computer, handheld equipment, an electronic tablet, a Personal Digital Assistant (PDA), a mobile phone, a network appliance, a camera, a video camera, an intelligent cell phone, a network base station, a media player, a navigation equipment, an e-mail equipment, a game equipment, an automatic information system (such as an entertainment system with a control panel) and a combination thereof.

According to the disclosure, the region of which the display parameter is adjusted is selected according to the touch operation over the operation object, so that a user may shoot or make contents subjected to personalized operation of the user, and moreover, the display effect of a part of the contents may be adjusted.

Those skilled in the art will understand that all or part of the steps in the method of the embodiment may be implemented through related hardware controlled by a program, the program may be stored in a computer-readable storage medium which may be a Read-Only Memory/Radom Access Memory (ROM/RAM), a magnetic disk, a compact disc and the like.

The description made above with reference to the drawings is only the preferred embodiment of the disclosure and not thus intended to limit the scope of the disclosure. Those skilled in the art may implement the disclosure by adopting multiple transformed solutions without departing from the scope and substance of the disclosure, and for example, a characteristic of an embodiment may be configured for another embodiment to obtain a further embodiment. Any modifications, equivalent replacements and improvements made by virtue of the technical concept of the disclosure shall fall within the scope of the disclosure.

INDUSTRIAL APPLICABILITY

According to the image processing method and device of the disclosure, the region of which the display parameter is adjusted is selected according to the touch operation over the operation object, so that the user may shoot or make contents subjected to personalized operation of the user, and moreover, the display effect of a part of the contents may be adjusted.

What is claimed is:

1. An image processing device, comprising:
   a display module configured to display an operation object;
   a touch control module configured to detect a first action and second action of touch operation; and
   a processing module configured to determine a first position of the first action on the operation object and a second position of the second operation on the operation object, and adjust a display parameter in the first position on the operation object and a display parameter in the second position on the operation object;
   wherein the processing module is further configured to adjust a display parameter of a region between the first position and the second position on the operation object;
   and wherein the region between the first position and the second position is defined by a first line passing through the first position, a second line passing through the second position and a display boundary of the operation object, and
   the first line is intersected with the display boundary of the operation object with two intersections, or the second line is intersected with the display boundary of the operation object with two intersections.

2. The image processing device according to claim 1, wherein the display parameter comprises colour, colour temperature, luminance, contrast, saturation or/and acutance.

3. The image processing device according to claim 1, wherein the touch control module comprises a first detection module configured to detect the first action changed from non-contact to contact with the touch control module, and a second detection module configured to detect the second action changed from contact to non-contact with the touch control module.

4. The image processing device according to claim 1, wherein the processing module comprises a position determination module configured to determine the first position of the first action on the operation object and the second position, which is different from the first position, of the second action on the operation object.

5. The image processing device according to claim 1, wherein the display parameter is colour, the processing module comprises a colour adjustment module configured to adjust a colour in the first position on the operation object and a colour in the second position on the operation object, and an adjustment degree of the colour is different between the first position and the second position.

6. The image processing device according to claim 1, wherein the processing module is further configured to adjust a display parameter of a region between the first position and the second position on the operation object to gradually change the display parameter of the region between the first position and the second position.

7. An image processing method, comprising:
   displaying an operation object;
   detecting a first action and second action of touch operation over the operation object; and
   determining a first position of the first action on the operation object and a second position of the second action on the operation object, and adjusting a display parameter in the first position on the operation object and a display parameter in the second position on the operation object;
   the method further comprises: adjusting a display parameter of a region between the first position and the second position on the operation object;
   wherein the region between the first position and the second position is defined by a first line passing through the first position, a second line passing through the second position and a display boundary of the operation object, and
   the first line is intersected with the display boundary of the operation object with two intersections; or the second line is intersected with the display boundary of the operation object with two intersections.

8. The image processing method according to claim 7, wherein the first action is an action changed from non-contact to contact with a touch control module, and the second action is a second action changed from contact to non-contact with the touch control module.

9. The image processing method according to claim 7, wherein the first action and the second action form a time sequence relationship.

10. The image processing method according to claim 7, further comprising: determining that an adjustment degree of the display parameter is different between the first position and the second position.

11. The image processing method according to claim 7, further comprising: adjusting a display parameter of a region between the first position and the second position on the operation object to gradually change the display parameter of the region between the first position and the second position.

* * * * *